(12) United States Patent
Zitting (10) Patent No.: US 12,473,779 B2
(45) Date of Patent: Nov. 18, 2025

(54) ASSEMBLY OF CELLULAR WINDOW BLINDS WITH UV CURE ADHESIVE

(71) Applicant: Lorin K. Zitting, Colorado City, AZ (US)

(72) Inventor: Lorin K. Zitting, Colorado City, AZ (US)

( * ) Notice: Subject to any disclaimer, the term of this patent is extended or adjusted under 35 U.S.C. 154(b) by 188 days.

(21) Appl. No.: 18/049,353

(22) Filed: Oct. 25, 2022

(65) Prior Publication Data

US 2023/0128772 A1    Apr. 27, 2023

Related U.S. Application Data

(60) Provisional application No. 63/271,295, filed on Oct. 25, 2021.

(51) Int. Cl.
*E06B 9/266* (2006.01)
*E06B 9/262* (2006.01)

(52) U.S. Cl.
CPC .............. *E06B 9/266* (2013.01); *E06B 9/262* (2013.01); *E06B 2009/2627* (2013.01)

(58) Field of Classification Search
None
See application file for complete search history.

(56) References Cited

U.S. PATENT DOCUMENTS

| | | | |
|---|---|---|---|
| 4,450,027 A | 5/1984 | Colson | |
| 4,631,217 A | 12/1986 | Anderson | |
| 4,945,969 A * | 8/1990 | Schnebly | E06B 9/266 160/84.02 |
| 5,158,632 A | 10/1992 | Colson et al. | |
| 5,228,936 A * | 7/1993 | Goodhue | B29C 66/83413 156/197 |
| 5,308,435 A | 5/1994 | Ruggles et al. | |
| 5,888,639 A | 3/1999 | Green et al. | |
| 6,767,615 B1 | 7/2004 | Judkins et al. | |
| 8,596,327 B2 * | 12/2013 | Rupel | E06B 9/262 160/84.05 |
| 2004/0065416 A1 | 4/2004 | Auger et al. | |
| 2007/0023119 A1 | 2/2007 | Dann et al. | |
| 2013/0068374 A1 * | 3/2013 | Balaschak | H10F 19/80 156/163 |
| 2016/0157532 A1 * | 6/2016 | Shiue | B29C 66/43 2/2.15 |

* cited by examiner

*Primary Examiner* — Michael N Orlando
*Assistant Examiner* — Abhishek A Patwardhan
(74) *Attorney, Agent, or Firm* — Gurr & Brande, PLLC; Robert A. Gurr (57) ABSTRACT

An assembly of cellular window blinds features a manufacturing process that accounts for the different physical properties of materials, helps the rate of shrinkage while cooling, and helps regulate the various heat and pressure for each material in the manufacturing process. The process describes a joining method using two strips of material to form a single-cell product or double-cell product. The assembly involves joining to strips of material to one another via application of an adhesive and curing the adhesive via a curing station. The strips of material are folded, pressed, and cooled prior to being fed into the assembly, thereby reducing or eliminating bowing or otherwise misshaping.

9 Claims, 9 Drawing Sheets

ASSEMBLY OF CELLULAR WINDOW BLINDS WITH UV CURE ADHESIVE

CROSS-REFERENCE TO RELATED APPLICATIONS

This application claims the benefit of U.S. Provisional Application Ser. No. 63/271,295, filed on Oct. 25, 2021, which is incorporated herein by reference.

TECHNICAL FIELD

The present disclosure relates to cellular window blinds. More specifically, the present disclosure relates to a method and apparatus for assembling cellular window blinds with UV cure adhesive.

BACKGROUND

Retractable window shade coverings ("blinds") can be made of cellular structures for control of light and/or insulation. These cellular structures can be a single row of hollow cells or multi-cellular ("honeycomb") configurations that are often produced by bonding together strips of folded or tubular material in stacks, forming an expandable fabric portion of the blind.

One traditional method of forming cellular window shade coverings involves joining two or more continuous strips of dissimilar material together prior to forming and bonding the strips into a cellular arrangement. The edges of the two strips may then be bonded together using butt joints or lap joints. Sometimes an adhesive, such as hot-melt, is used. Other times the two strips are joined using thermal welding or similar methods. The joined sub-assembly is then continuously crimped, folded, and heat-pressed into a "formed" strip or cell. This sub-assembly can be formed in various shapes or sizes depending on the desired product configuration. The sub-assemblies are then stacked together with two or more glue beads between them to form the larger cellular assembly, such as a blanket, honeycomb, accordion configuration.

There are some major problems, however, with joining the multiple strips prior to forming and pressing. Because the multiple strips that make up the assembly are of different materials, they also have different physical properties. This means that the temperature and pressure parameters needed to press- or heat-set one side may be entirely different than the parameters needed for the other side. Additionally, the rate of shrinkage while cooling for one material may be different than that of the other. Typically, after the product is joined and assembled, the final product will arc or bow in the direction of the material having the highest built-in tension or contraction due to shrinkage or heat damage from either the joining or heat pressing process. Even high temperature adhesives used to join the two strips can cause heat damage to the edge of one or both materials.

Accordingly, there is a need for an assembly process that accounts for the different physical properties of blind materials, helps the rate of shrinkage while cooling for one material, and helps regulate the various heat and pressure for each material in the manufacturing process. The present disclosure solves these problems and others.

SUMMARY OF EXAMPLE EMBODIMENTS

In some embodiments, by employing a different order of operations than that currently used in the art, each strip of material undergoes its individual stress relief and shrinkage prior to being joined to the other material. For example, in some assemblies for manufacturing cellular blinds, the assembly begins with a plurality of strips, then by doubling the forming, heat pressing, and cooling equipment in the manufacturing process, the strips can each be formed and heat-pressed using the parameters most suitable for that particular material prior to joining them together. After heat pressing, each material is cooled to a low enough temperature that further shrinkage or distortion is minimalized. The pre-formed sides are then joined using a low tension and low temperature bonding method. By allowing each side to relax to a near free state prior to joining, there is no tension or contraction from either side material to bow or distort the final product. After the pre-formed sides are processed and cooled as described above, each side is allowed to relax linearly to a no-tension or micro-tension control state prior to guiding the strips together for joining.

In some embodiments, an assembly for joining two or more strips of cellular blind material comprises a first tension control loop, a second tension control loop, a captivation guide member, a large wheel, a first captivation belt, a second captivation belt, a plurality of captivation belt pulleys, an adhesive applicator, an adhesive curing station, and an exit roller. A first strip of material and a second strip of material are conveyed through the assembly and are joined together to form a product strip through low-temperature adhesion and curing.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for an assembly method and apparatus that account for the different physical properties of strips of material, that regulates the heat and pressure profile of each material in the manufacturing process, and that mitigates the rate of contraction when cooling the strips of material to prevent bowing. The assembly of cellular blinds with UV curing adhesive or other fast acting, low temperature bonding and related innovative manufacturing processes disclosed herein solve these and other problems.

Figure 1:
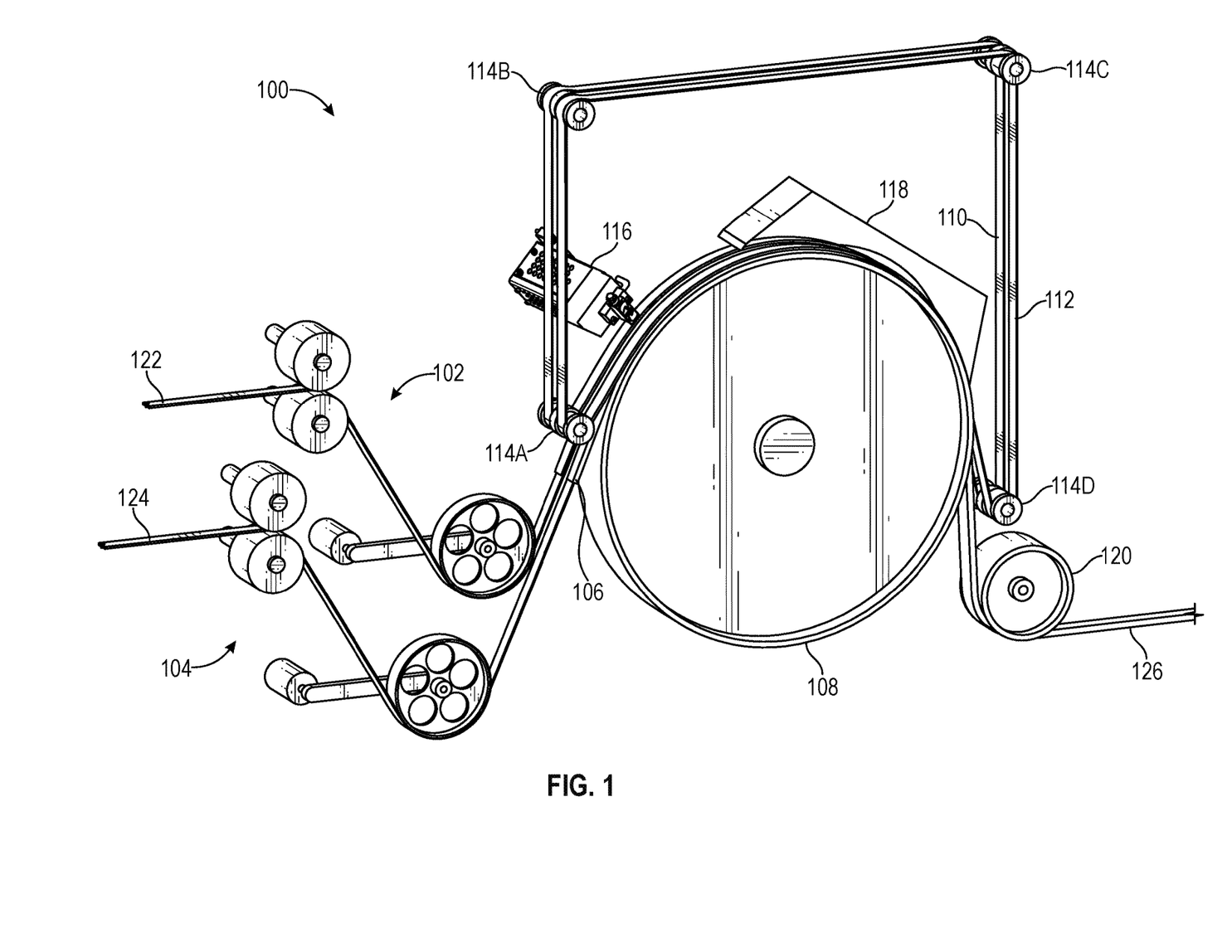
FIG. 1 illustrates a top, front, left side perspective view of a joining station of an assembly for manufacturing cellular blinds.

As shown in FIG. 1, an assembly for manufacturing cellular blinds 100 may comprise a first tension control loop 102, a second tension control loop 104, a captivation guide member 106, a large wheel 108, a first captivation belt 110, a second captivation belt 112, a plurality of captivation belt pulleys 114A, 114B, 114C, 114D, an adhesive applicator 116, an adhesive curing station 118, and an exit roller 120. A first strip of material 122 and a second strip of material 124 are conveyed through the assembly 100 and are joined together to form a product strip 126 through low-temperature adhesion and curing. The first strip of material 122 may have a different composition than the second strip of material 124. It will be appreciated that through employing a different order of operations than the prior art, the assembly 100 allows each strip of material 122, 124 to undergo its own individual folding or forming, heat pressing, cooling, stress relief, and shrinkage prior to being joined through adhesion to each other and forming the product strip 126. The removal of traditional high-temperature bonding methods from the process allows the first and second strips of materials 122, 124 to linearly relax to a micro-tension control state without tension or contraction bonded into the strips of materials 122, 124, thereby avoiding distortion and deformation of the product strip 126 and, by implication, the final window blinds.

Figure 2:
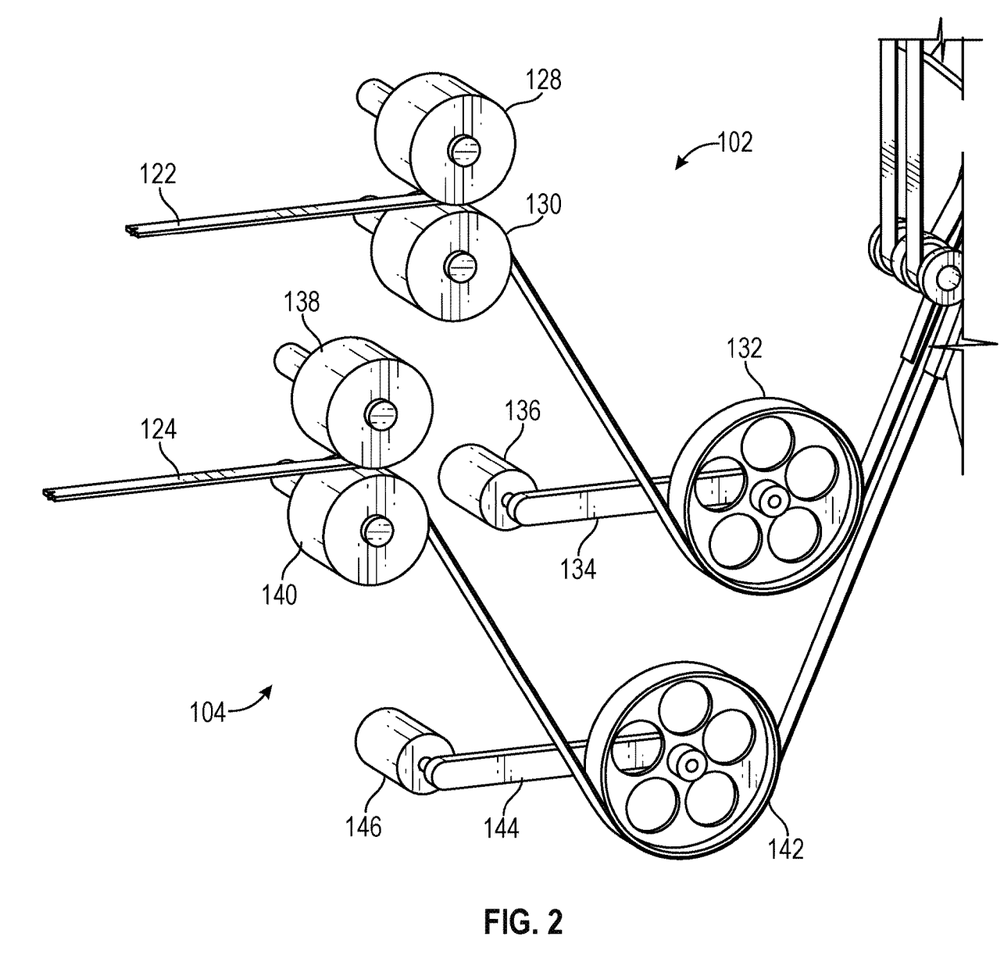
FIG. 2 illustrates a top, front, left side perspective view of a micro tension control assembly of a joining station of an assembly for manufacturing cellular blinds.

As shown in FIG. 2, the first tension control loop 102 may further comprise a first roller 128, a second roller 130, a first dancer roller 132, a first dancer arm 134, and a first dancer cylinder 136. The second tension control loop 104 may similarly comprise a third roller 138, a fourth roller 140, a second dancer roller 142, a second dancer arm 144, and a second dancer cylinder 146. The first tension control loop 102 is configured to maintain tension in the first strip of material 122 and the second tension control loop 104 is configured to maintain tension in the second strip of material 124 as the first and second strips of material 122, 124 are being conveyed through the assembly 100.

The first and second strips of material 122, 124 enter the first and second control loops 102, 104 (or "dancers") respectively, to establish the exact amount of tension each side needs prior to the first and second strips of material 122, 124 being joined together. Each control loop 102, 104 may provide closed-loop feedback for velocity control to keep the dancer arms 134, 144 in position while providing minimal tension to the joined product strip 126. The first and second tension control loops 102, 104 may each comprise tension measurement devices such as a load cell, a dancer position feedback sensor, or a potentiometer, wherein the tension measurement devices are configured to constantly relay tension changes directly from the strips of material 122, 124 to the tension controller, which then regulates the output of the torque device, which may be a tension brake, clutch, or drive to maintain the desired tension level. In one example, torque may be applied at the pivot point (e.g., dancer cylinder 136 and/or second dancer cylinder 146) through an electronic servo or torque motor device.

It will be appreciated that the first and second tension control loops 102, 104 work complementary with one another and allow the overall assembly 100 to absorb fluctuations in tension zones caused by various factors like out-of-round rolls and create a degree of mechanical stability as the two strips of materials 122, 124 are positioned and transported through the assembly 100. Thus, the tension control loops 102, 104 maintain a predetermined or set amount of stress or strain on the first and second strips of material 122, 124 between two points to maintain its desired properties such as form, appearance, and quality.

Figure 3:
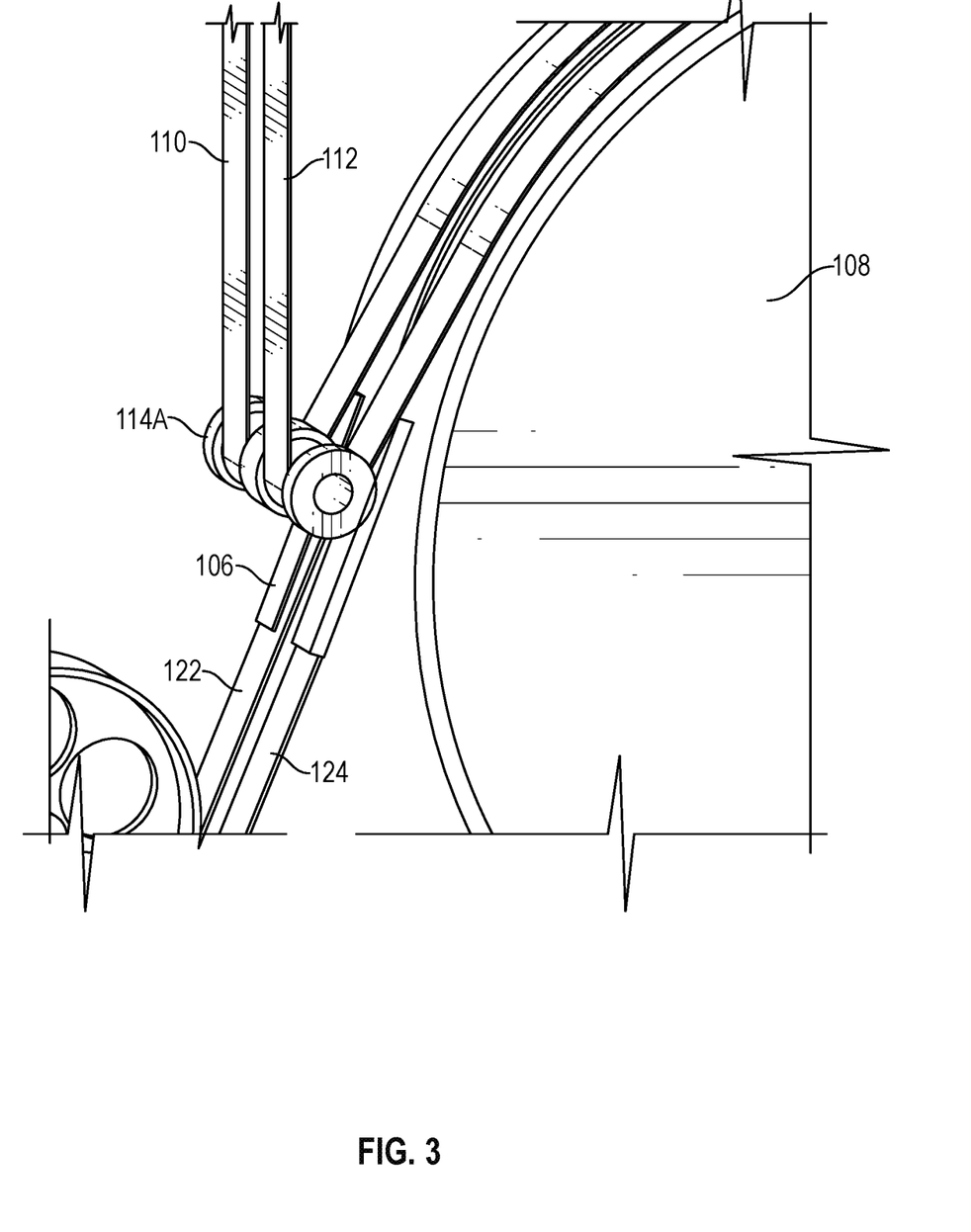
FIG. 3 illustrates a top, front, left side detailed perspective view of a captivation assembly bonding together two strips of blinds materials of an assembly for manufacturing cellular blinds.

FIG. 3 illustrates a captivation process wherein a captivation guide member 106, positioned after the first and second tension control loops 102, 104, is configured to guide the strips of material 122, 124 being conveyed through the assembly 100 into alignment with one another. After micro-tension control is established, the first and second strips of material 122, 124 are then guided to butt up together in the middle as they become captivated between a large wheel 108 and first and second captivation belts 110, 112, respectively, thus maintaining the first and second strips of material 122, 124 in place through the joining process. In some embodiments, the first and second strips of material 122, 124 are positioned to overlap with one another creating a lap joint when adhesive or tape is later applied.

Figure 4:
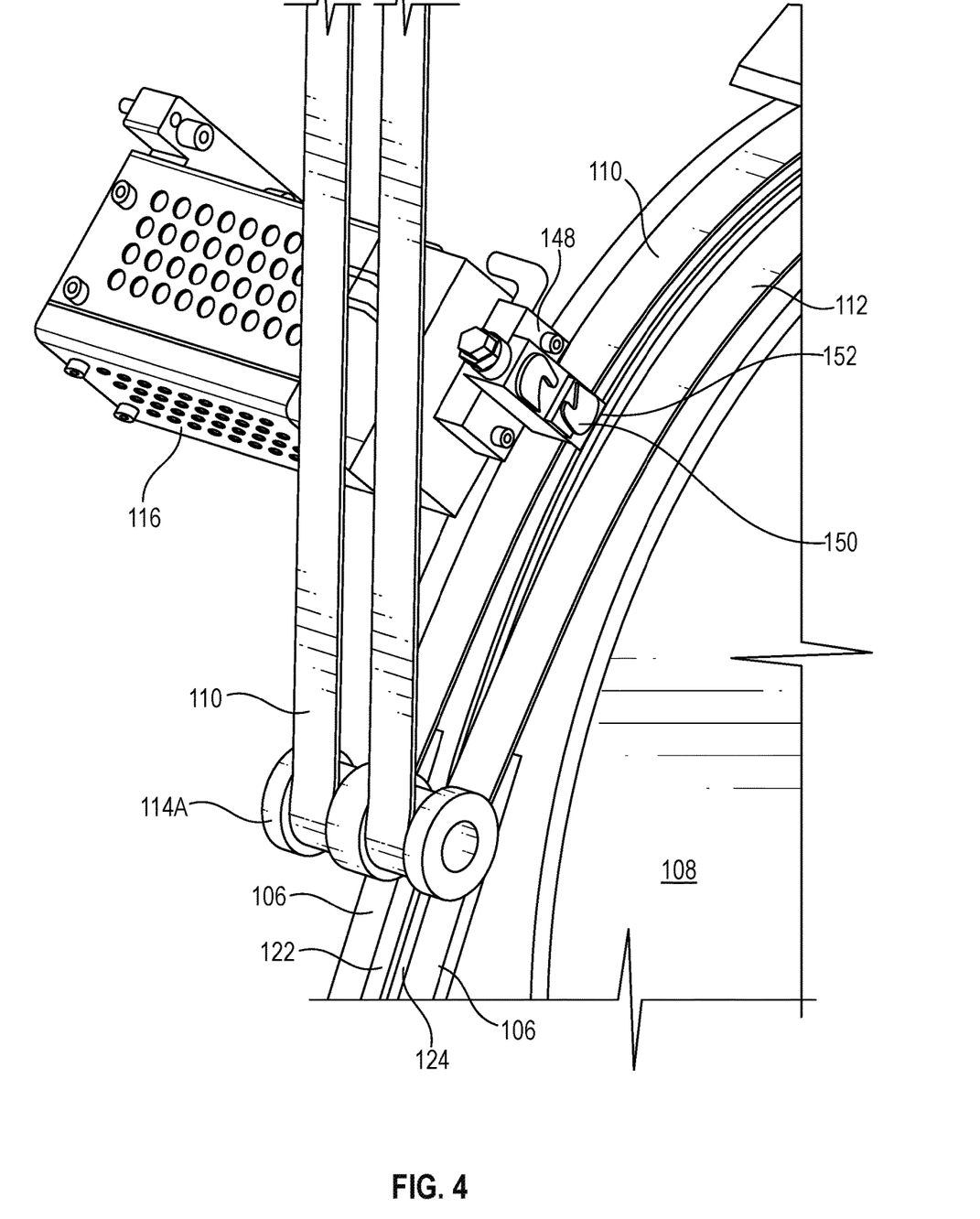
FIG. 4 illustrates a top, front, left side detailed perspective view of an adhesive applicator of an assembly for manufacturing cellular blinds.

FIG. 4 shows an adhesive applicator 116 applying adhesive to the first and second strips of material 122, 124. Once the first and second strips of material 122, 124 have been captivated side by side (e.g., via the captivation guide member 106), the strips 122, 124 pass under the adhesive applicator 116 having an application head 148 that may comprise a nozzle 150 (e.g., slot nozzle) which applies a thin layer of adhesive 152 over a joining area where the first and second strips of material 122, 124 make contact together (e.g., butt or lap joint). In some embodiments, the nozzle 150 may be a swirl nozzle, wherein the adhesive 152 may be applied through direct contact or by gap application to the joining area. In some embodiments, the adhesive applicator 116 comprises a roller or other mechanism to apply a film tape adhesive.

This adhesive 152 will join the two strips of material 122, 124 together. In a preferred embodiment the adhesive 152 is ultraviolet (UV) activated or photo-initiated. The UV-activated adhesive 152 may be clear and colorless and comprise multi-component adhesives where the second component is a photochemical promoter, which can degrade into free radicals when exposed to UV light. These free radicals then significantly speed up the rate at which the UV adhesive 152 cures, overcoming the traditional activation energy and temperature constraints of standard adhesives to induce cross-linking at the molecular level rather than depending on drying. If UV activated adhesive 152 is not practical, however, for the particular strip material combination or other reasons, a hot-melt type adhesive or some other form of fast-activated adhesive or a film tape may be a suitable alternative. Alternatively, the adhesive 152 may be pressure sensitive, wherein no solvent, water, or heat is needed to activate the adhesive 152 in the presence of sufficient pressure. For example, an additional wheel or wheels or rollers may be used to apply pressure to the strips 122, 124 having the pressure-sensitive adhesive thereon to thereby cure it. The adhesive applicator 116 may comprise the wheels or rollers to apply this pressure, or they may be located at a subsequent location. Additionally, in some embodiments, a chemical activator may be applied to the adhesive to cure it, whether exposed to subsequent UV or not. And, as noted earlier, in some embodiments, tape may be used as the method of adhesion. When using tape, the nozzle 150 would be replaced with a tape applicator (e.g., roller).

Figure 5A:
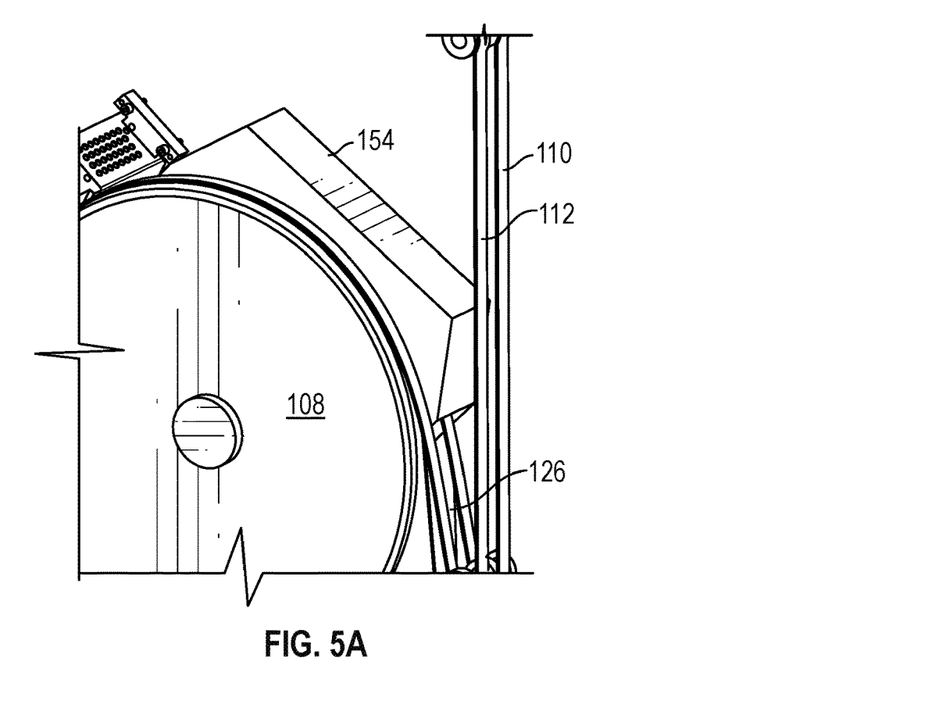
FIG. 5A illustrates a top, front, right side detailed perspective view of an adhesive curing station of an assembly for manufacturing cellular blinds.

FIG. 5A illustrates an adhesive curing station 154 for the adhesive 152. After the application of the adhesive 152, the resulting product strip 126 (i.e., the strips of material 122, 124 joined by the adhesive 152 at joint 153) pass under an adhesive curing station 154. In some embodiments, the adhesive curing station 154 comprises a high intensity ultraviolet curing lamp configured to instantly activate and harden the UV-activated adhesive 152. To accelerate the curing process, the intensity of the UV light may be adjusted, or additional UV curing lamps may be added in succession, circumscribing the large wheel 108.

Figure 5B:
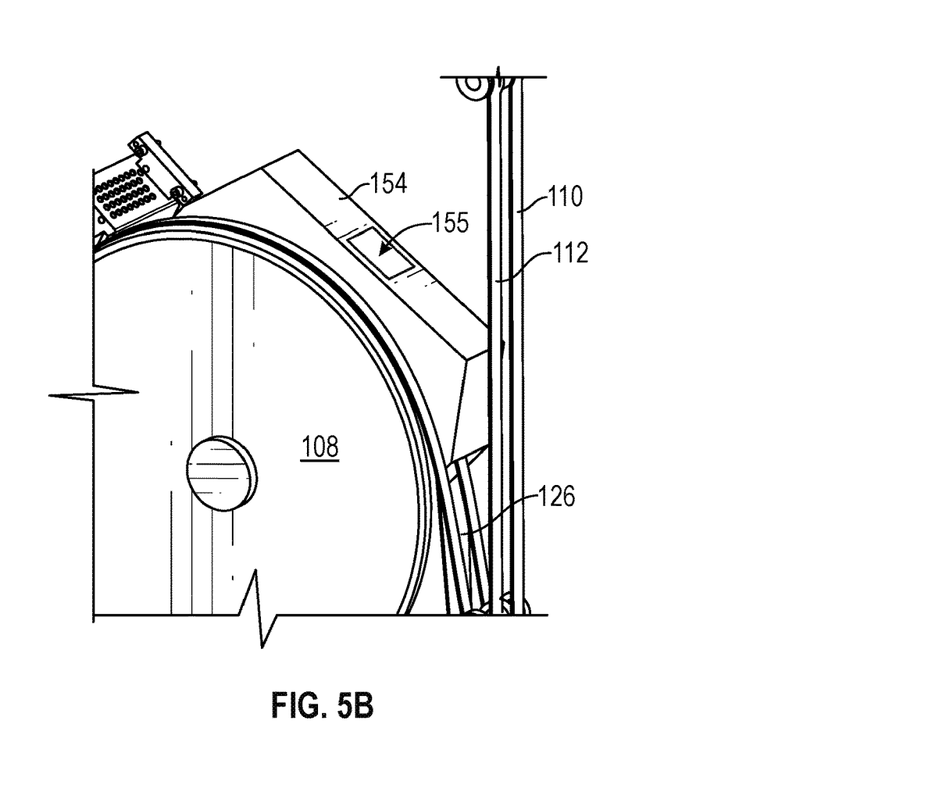
FIG. 5B illustrates a top, front, right side detailed perspective view of an adhesive curing station of an assembly for manufacturing cellular blinds.
Figure 6:
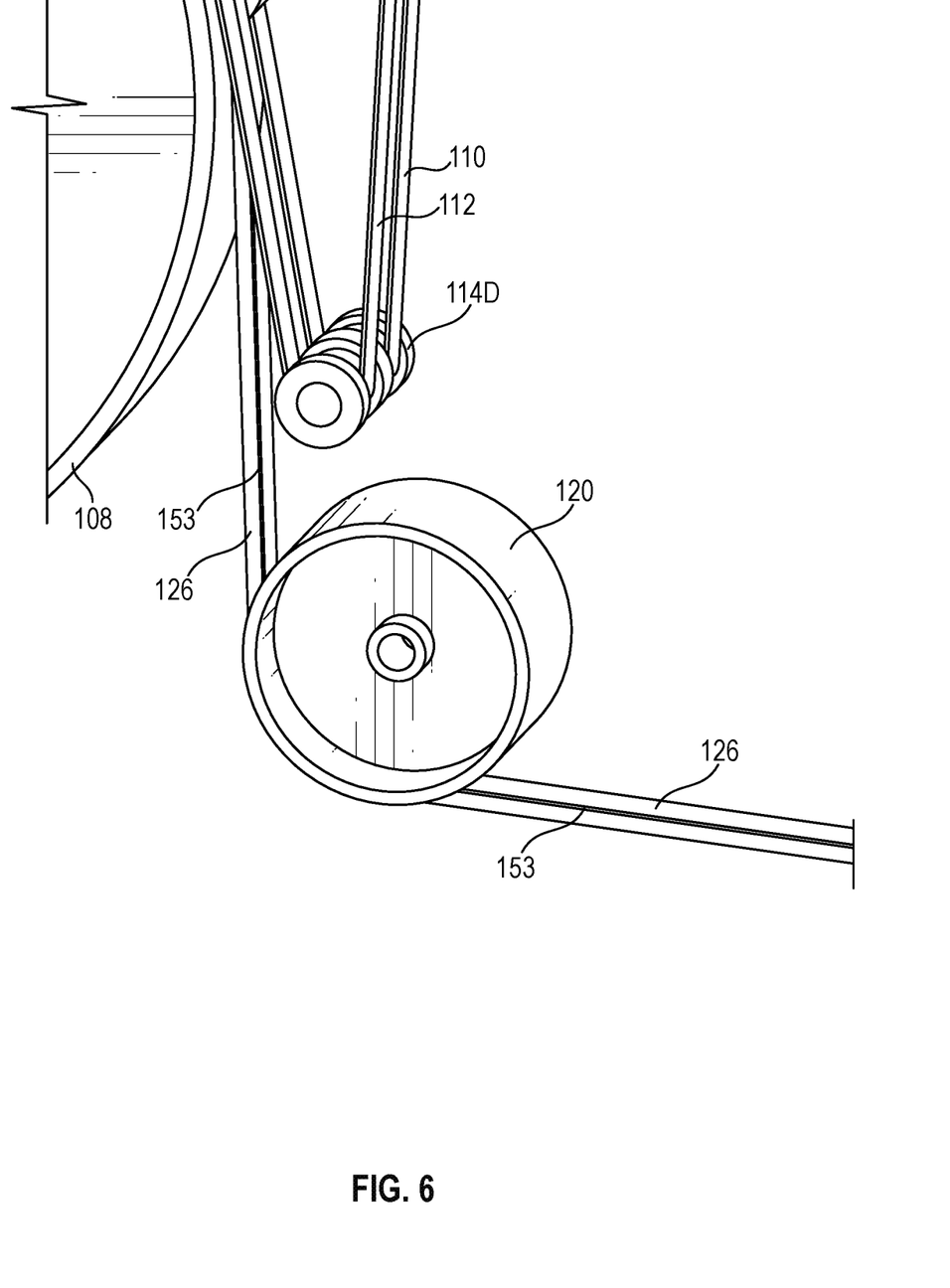
FIG. 6 illustrates a top, front, right side perspective view of a joining exit station of an assembly for manufacturing cellular blinds.

In some embodiments, as shown in FIG. 5B, when a hot-melt adhesive 152 is used instead of a UV-activated adhesive, the adhesive curing station 154 may instead comprise a chilled air duct 155 configured to direct cold air onto the joining area to harden the adhesive 152. Preferably, the curing station 154 induces a fast cure and at low temperatures so as to avoid misshaping. As shown in FIG. 6, the product strip 126 then disengages from the assembly 100 via an assembly exit. The assembly exit may comprise the exit roller 120 positioned after the large wheel 108 configured to release the product strips from the captivation belts 110, 112.

Figure 7:
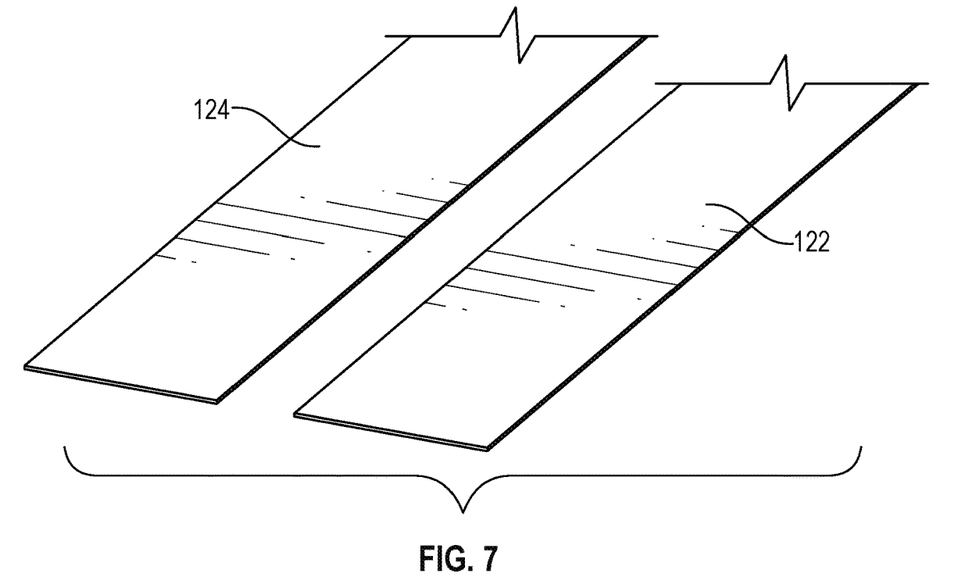
FIG. 7 illustrates a top, front, right side perspective view of two dissimilar strips of blind materials that come off a roll continuously of an assembly for manufacturing cellular blinds.
Figure 8:
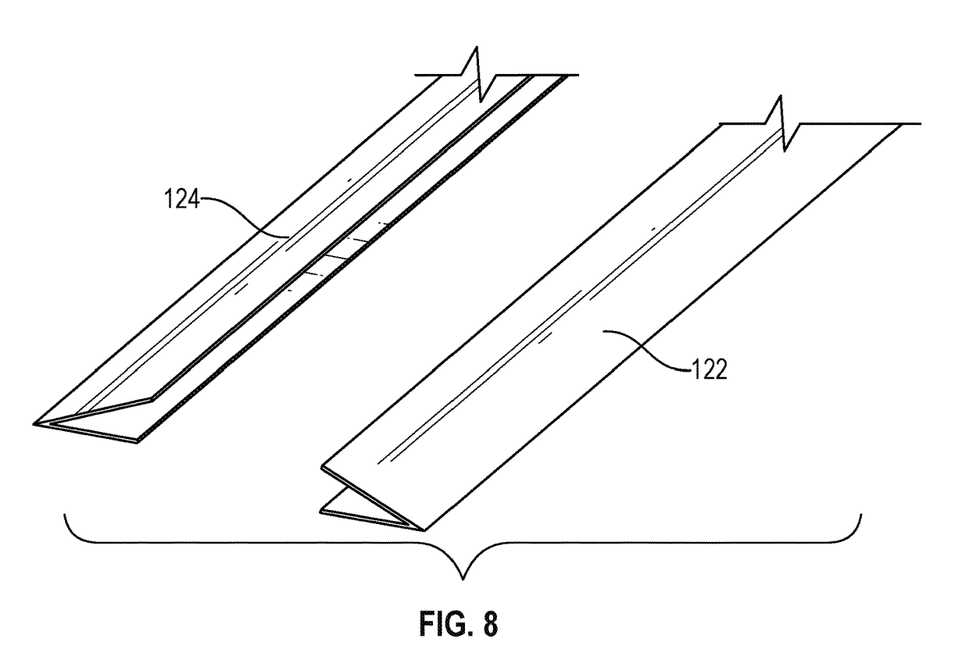
FIG. 8 illustrates a top, front, right side perspective view of two dissimilar strips of blind materials shaped by doubling the forming, pressing, and cooling equipment in the manufacturing process of an assembly for manufacturing cellular blinds.

It will be appreciated that by employing a different order of operations, each strip of material 102, 104 undergoes its individual stress relief and shrinkage prior to being joined to the other material, allowing customization for varying materials of strips. As shown in FIG. 7, beginning with the first and the second strips of material 122, 124, they are folded and pressed, as shown in FIG. 8. Preferably, the strips 122, 124 are then cooled before being fed into the assembly 100 for joining them to one another. In other words, the first and second strips of material 122, 124 can each be formed and heat-pressed using the parameters most suitable for that particular material prior to joining them together. This is especially beneficial when the two (or more) strips comprise different material. After pressing, each of the strips of material 122, 124 is cooled to a low enough temperature that further shrinkage or distortion is minimalized. The preformed sides would then be joined (e.g., adhered) using the low tension and low temperature bonding method described above and shown in FIGS. 1-6. By allowing each strip 122, 124 to relax linearly to a no tension or micro-tension state prior to joining, there is no tension or contraction bonded in from either strip of material 122, 124 to bow or distort the product strip 126, overcoming problems in the prior art.

Figure 9:
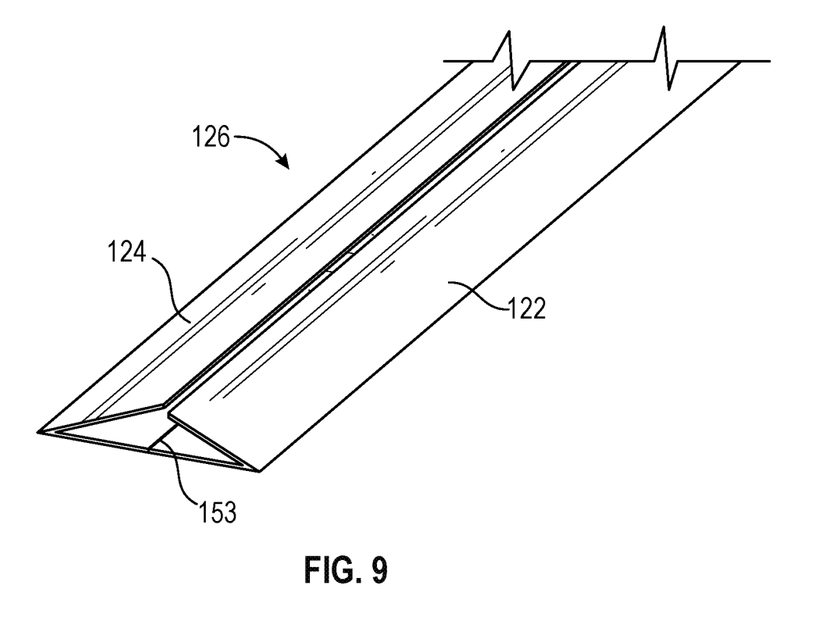
FIG. 9 illustrates a top, front, right side perspective view of two pre-formed sides that are joined using a low tension and low temperature bonding method of an assembly for manufacturing cellular blinds.
Figure 10:
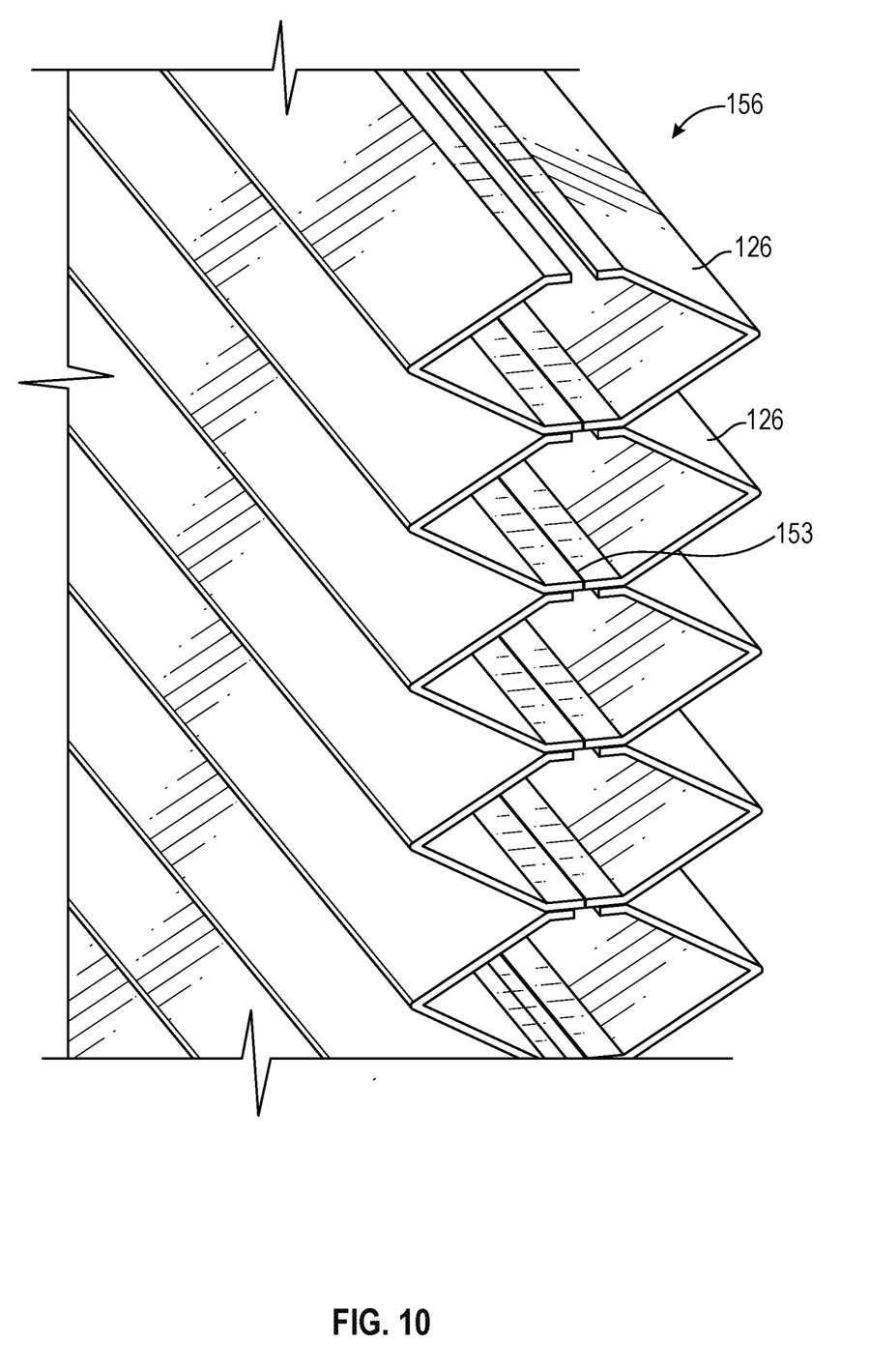
FIG. 10 illustrates a top, front, left side perspective view of sub-assemblies that are stacked together with two or more glue beads between them to form the cellular blind material or a blanket, honeycomb, or accordion of an assembly for manufacturing cellular blinds.

Once the adhesive 152 has been activated, the now joined strips 122, 124 form the product strip 126, as shown in FIG. 9, which may be a cell or strip assembly. The product strip 126 may leave the confinement of the belts 110, 112 and rollers (e.g., 108, 120, 132, 142) within the assembly 100 and move onto the next steps in the manufacturing process, where they can be cut to length and joined into cellular material for use as retractable window shade coverings 156 or similar products, as shown in FIG. 10. As appreciated, this process allows two or more dissimilar materials to be used when forming cellular material.

In some embodiments, as shown in FIGS. 1-10, a method of using an assembly for manufacturing cellular blinds 100 comprises folding, pressing, and cooling a first strip of material 122 and a second strip of material 124, wherein the second strip of material 124 may be of a different composition than the first strip of material, although not required; supplying the first strip of material 122 and the second strip of material 124 to the assembly for manufacturing cellular blinds 100, wherein the first strip of material 122 is conveyed into a first tension control loop 102 and the second strip of material 124 is conveyed into a second tension control loop 104. Next, the method entails positioning a lateral surface of the first strip of material 122 next to a lateral surface of the second strip of material 124 using the captivation guide member 106 and securing the first strip of material 122 within the first captivation belt 110 and securing the second strip of material 124 within the second captivation belt 124, wherein each captivation belt 110, 112 is configured to engage a top surface of the strip of material 122, 124 being conveyed, and the large wheel 108 is configured to engage a bottom surface of the first and second strips of material 122, 124. In other words, the first and second strips 122, 124 are interposed between the captivation belts 110, 112 and the large wheel 108, keeping the strips 122, 124 in place and in contact with one another (either butting-up or overlapping, depending upon user preferences) during application of the adhesive 152 and curing thereof. The method of use then comprises joining the first and second strips of material 122, 124 together through application of an adhesive 152 (e.g., UV-activated, pressure-activated, chemical-activated, tape, etc.) where the strips 122, 124 make contact with one another to form a single product strip 126, subsequently curing the adhesive 152 with an adhesive curing station 118, and then discharging the product strips from the assembly 100.

As previously discussed, in some embodiments, the method of using an assembly for manufacturing cellular blinds 100 may comprise initially folding and heat pressing the first strip of material 122, folding and heat pressing the second strip of material 124, cooling the first and second strips of material 122, 124 until the first and second strips of material 122, 124 relax linearly to a micro-tension control state. The first and second strips of materials 122, 124 may then be supplied to the assembly for manufacturing cellular blinds 100.

While the above process describes a joining method using two or more strips of material to form a single-cell product, this same method could be utilized for other material configurations such as double-cell material. This method may also be used for products constructed of more than two strips by simply replicating componentry. Accordingly, the assembly for manufacturing cellular blinds 100 solves the need for an assembly method and apparatus that account for the different physical properties of strips of material, that regulates the heat and pressure profile of each material in the manufacturing process, and that mitigates the rate of contraction when cooling the strips of material to prevent bowing.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A method of using an assembly for manufacturing cellular blinds, the method comprising:
    cooling a first strip of material and a second strip of material until the first and second strips of material relax linearly to a micro-tension control state;
    supplying the first strip of material and the second strip of material to an assembly for manufacturing cellular blinds, wherein the first strip of material is conveyed into a first tension control loop and the second strip of material is conveyed into a second tension control loop;
    positioning a lateral surface of the first strip of material next to a lateral surface of the second strip of material;
    joining the first and second strips of material together through application of an adhesive;
    curing the adhesive with an adhesive curing station to form a product strip; and discharging the product strip from the assembly.

2. The method of claim 1, further comprising curing the adhesive with ultraviolet light.

3. The method of claim 1, further comprising curing the adhesive with a chilled air duct configured to direct cold air at the adhesive.

4. The method of claim 1, further comprising curing the adhesive through applying pressure to the adhesive.

5. The method of claim 1, further comprising curing the adhesive through application of a chemical activator.

6. A method of using an assembly for manufacturing cellular blinds, the method comprising:
    folding and heat pressing a first strip of material;
    folding and heat pressing a second strip of material;
    cooling the first and second strips of material until the first and second strips of material relax linearly to a micro-tension control state;
    supplying the first strip of material and the second strip of material to an assembly for manufacturing cellular blinds, wherein the first strip of material is conveyed into a first tension control loop and the second strip of material is conveyed into a second tension control loop;
    positioning a lateral surface of the first strip of material next to a lateral surface of the second strip of material using a captivation guide member;
    joining the first and second strips of material together through application of an adhesive or tape;
    curing the adhesive with an adhesive curing station to form a product strip; and discharging the product strip from the assembly.

7. The method of claim 6, further comprising curing the adhesive with ultraviolet light.

8. The method of claim 6, further comprising curing the adhesive with a chilled air duct configured to direct cold air at the adhesive.

9. The method of claim 6, further comprising curing the adhesive through applying pressure to the adhesive or through chemical activation.

\* \* \* \* \*